Dec. 5, 1950 B. R. KAMLER 2,532,555

TONE ARM PROTECTING MECHANISM

Filed Aug. 27, 1945 7 Sheets-Sheet 1

Inventor

Benedict R. Kamler:

By: Wilkinson Huxley Byron & Knight

Attys.

Inventor

Benedict R. Kamler:

By: Wilkinson Huxley Byron & Knight
Attys.

Dec. 5, 1950 B. R. KAMLER 2,532,555

TONE ARM PROTECTING MECHANISM

Filed Aug. 27, 1945 7 Sheets-Sheet 3

Inventor

Benedict R. Kamler

By: Wilkinson, Huxley, Byron & Knight

Attys.

Dec. 5, 1950

B. R. KAMLER 2,532,555

TONE ARM PROTECTING MECHANISM

Filed Aug. 27, 1945

7 Sheets-Sheet 4

Inventor

Benedict R. Kamler:

By: Wilkinson Huxley Byron & Knight
Attys.

Dec. 5, 1950 B. R. KAMLER 2,532,555

TONE ARM PROTECTING MECHANISM

Filed Aug. 27, 1945 7 Sheets-Sheet 5

Inventor

Benedict R. Kamler:

By: Wilkinson Huxley Byron & Knight Attys

TONE ARM PROTECTING MECHANISM

Filed Aug. 27, 1945 7 Sheets-Sheet 6

Inventor
Benedict R. Kamler:
By: Wilkinson Huxley Byron & Knight
Att'ys

Dec. 5, 1950 B. R. KAMLER 2,532,555

TONE ARM PROTECTING MECHANISM

Filed Aug. 27, 1945 7 Sheets-Sheet 7

Inventor

Benedict R. Kamler

By Wilkinson, Huxley, Byron & Knight

Attys.

Patented Dec. 5, 1950 2,532,555

UNITED STATES PATENT OFFICE 2,532,555

TONE ARM PROTECTING MECHANISM

Benedict R. Kamler, South Haven, Mich., assignor to Edward Gray, Chicago, Ill.

Application August 27, 1945, Serial No. 612,836

16 Claims. (Cl. 274—9)

The invention relates to phonographs and has reference in particular to a record playing device having novel means for automatically protecting the record and the tone arm during play and wherein the operator has access to the turntable only during non-play for the purpose of changing records.

The record playing device of the invention has been designed to fulfill a definite need of dealers in records who are required to allow customers to handle their records and to manipulate whatever type of phonograph they have been able to provide. This is costly to the dealers since the records are often damaged by careless customers who drop the tone arm on the record or scratch the record by failing to properly lift the tone arm. Also the needles are subject to damage and since it is important to the dealer that a high quality needle be used for the best reproduction, this creates a temptation for the customer to appropriate the needle. The dealer is constantly checking his equipment and replacing damaged or stolen parts.

An object of the invention is to provide a phonograph which will be automatic in the playing of a record after the same has been placed on the turntable and which will provide means for protecting both the record and tone arm during play.

Another object of the invention is to provide a phonograph having improved means for automatically manipulating the tone arm so that the customer or operator is not required to handle the same, thereby eliminating the possibility of damage to the tone arm and also the record.

A more specific object of the invention resides in the provision of a record playing device having novel means for actuating the tone arm and wherein the tone arm and record are automatically covered by canopy means for protection during play, with the tone arm likewise being protected during non-play so that the customer or operator is only required to change records.

Another object of the invention resides in the provision of mechanism for automatically manipulating the tone arm and which will properly position the arm for a ten or twelve inch record.

Another object is to provide a phonograph which will be automatic in the playing of a record and which will protect the record and tone arm during play, and wherein switch means are provided which may be actuated by the operator for terminating the playing of the record in advance and returning the parts to rest.

Another object is to provide improved mechanism for application to a record playing device for accomplishing the objectives herein set forth, and which will be simple in construction and efficient in operation.

With these and various other objects in view, the invention may consist of certain novel features of construction and operation as will be more fully described and particularly pointed out in the specification, drawings and claims appended hereto.

In the drawings, which illustrate an embodiment of the invention, and wherein like reference characters are used to designate like parts—

Figure 1:
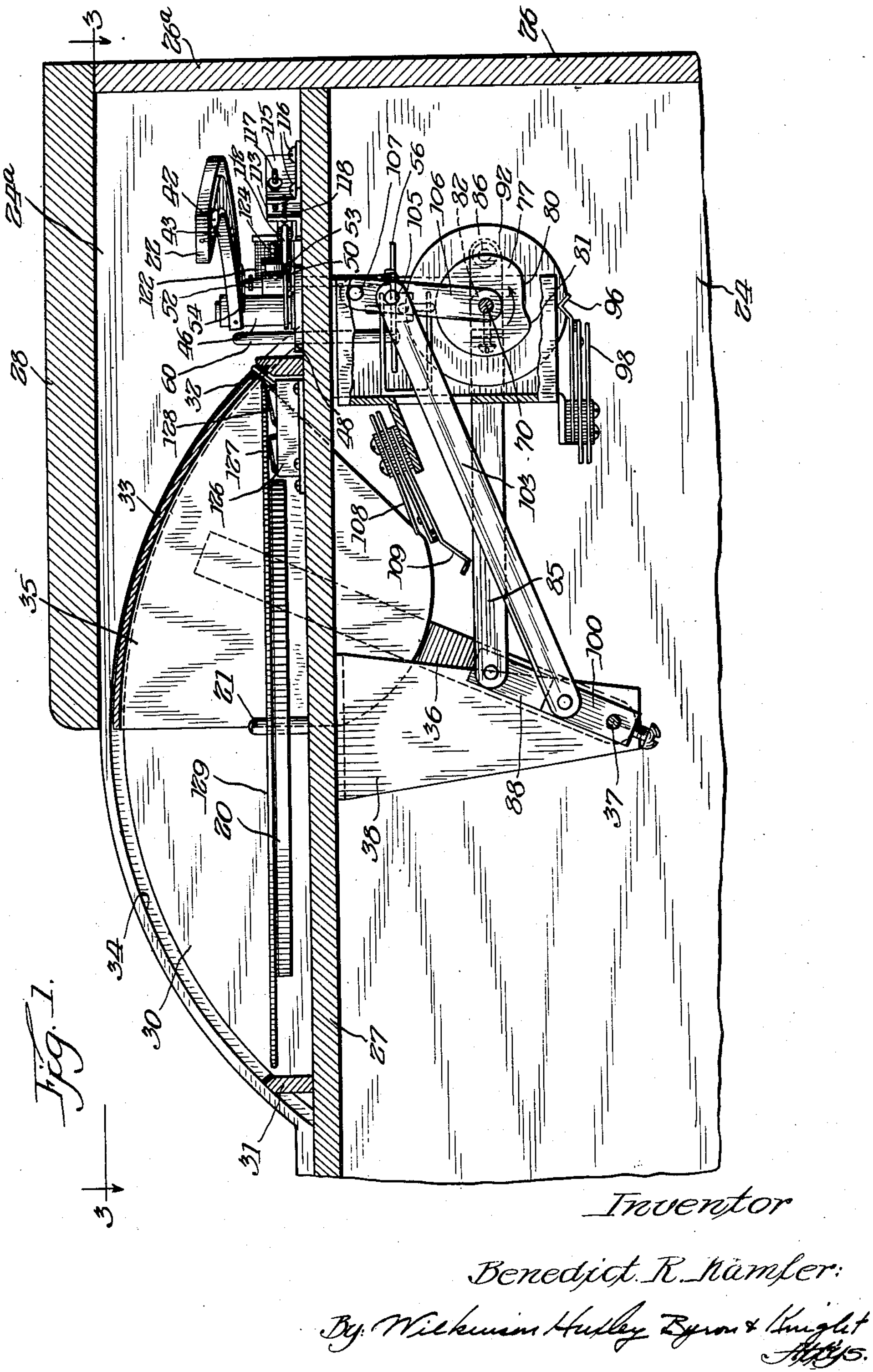
Figure 1 is a fragmentary vertical sectional view illustrating an embodiment of the phonograph mechanism comprising the improvements of the invention, with the parts shown in non-playing position.

Referring to the drawings which illustrate an embodiment of the invention, conventional phonograph elements are disclosed including a turntable 20 and tone arm 22 with the turntable having the usual center pin 21. The turntable is suitably supported for rotation and is driven by the electric motor 23 shown in the wiring diagram, Figure 10. The cabinet for the phonograph mechanism of the invention essentially includes side members 24, a back wall 26, and a horizontal partition member 27 for supporting various mechanism and above which is located turntable 20 and the tone arm 22. The back wall 26 extends above the horizontal partition member 27 and likewise said side members project above 27 to a certain extent for purposes to be presently described. A top wall or cover 28 is suitably secured to said upwardly projecting portions 26*a* of the back wall and 24*a* of the side members. Said portions, together with top wall 28, provide a cover for a part of the turntable. More particularly, the top wall 28 covers the rear half portion of the turntable, and the same also provides a cover for the tone arm which is located within this part of the cabinet to the rear of the turntable. In accordance with the invention the projecting portions 24*a* have forward extensions 30 which extend beyond the forward edge of the turntable and of course on each side of the same.

Figure 3:
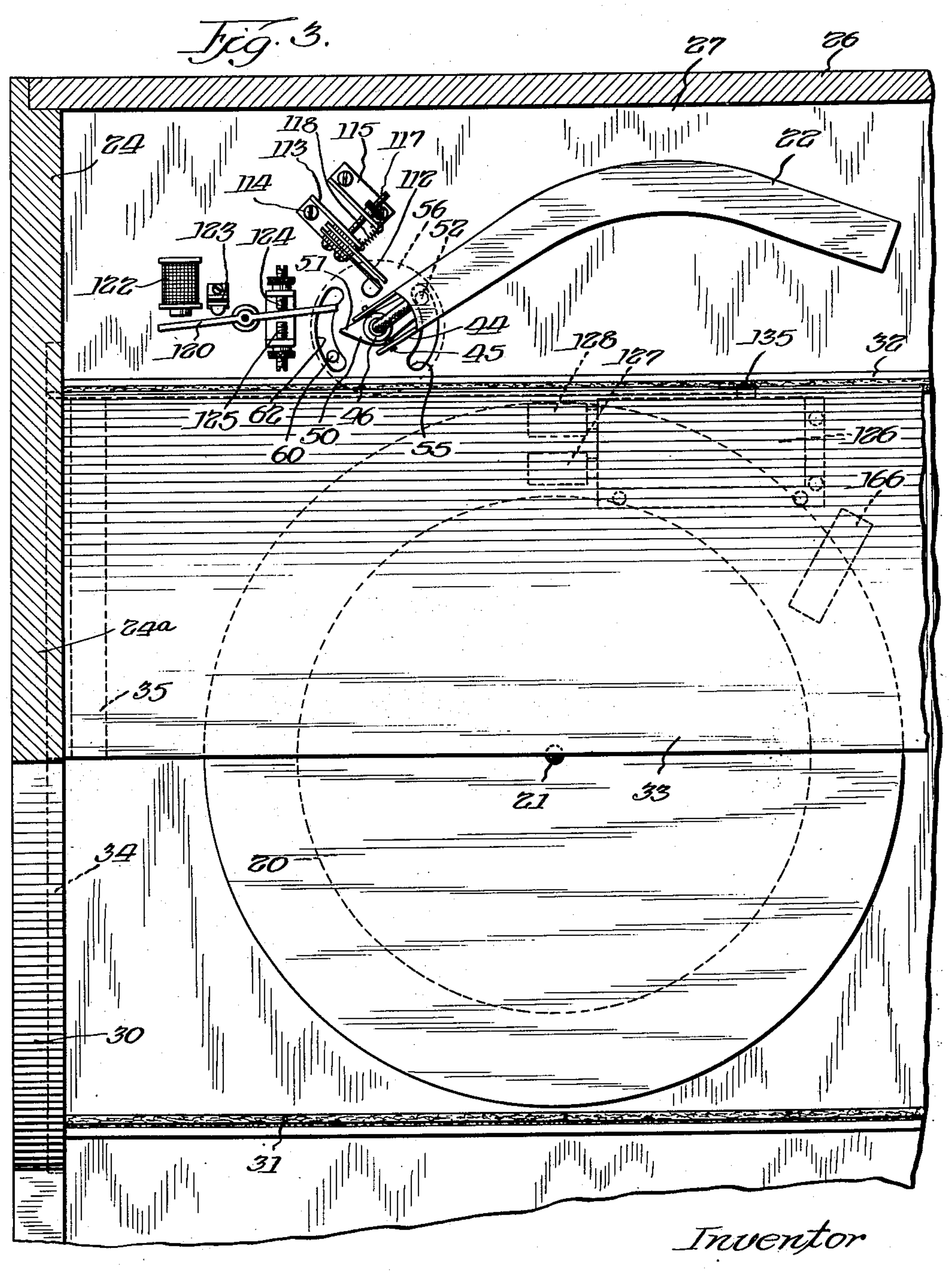
Figure 3 is a horizontal sectional view taken along line 3—3 of Figure 1 showing certain parts of the mechanism in plan.

Upstanding supports 31 and 32 extend transversely of the cabinet, as best shown in Figures 1 and 3, the supports extending upwardly from and being fixed to partition wall 27. Support 31 is located forwardly of the turntable and between extensions 30 to connect the same. Support 32 is located under the top wall 28 and rearwardly of the turntable and extends between portions 24*a* of the side walls of the cabinet.

Figure 2:
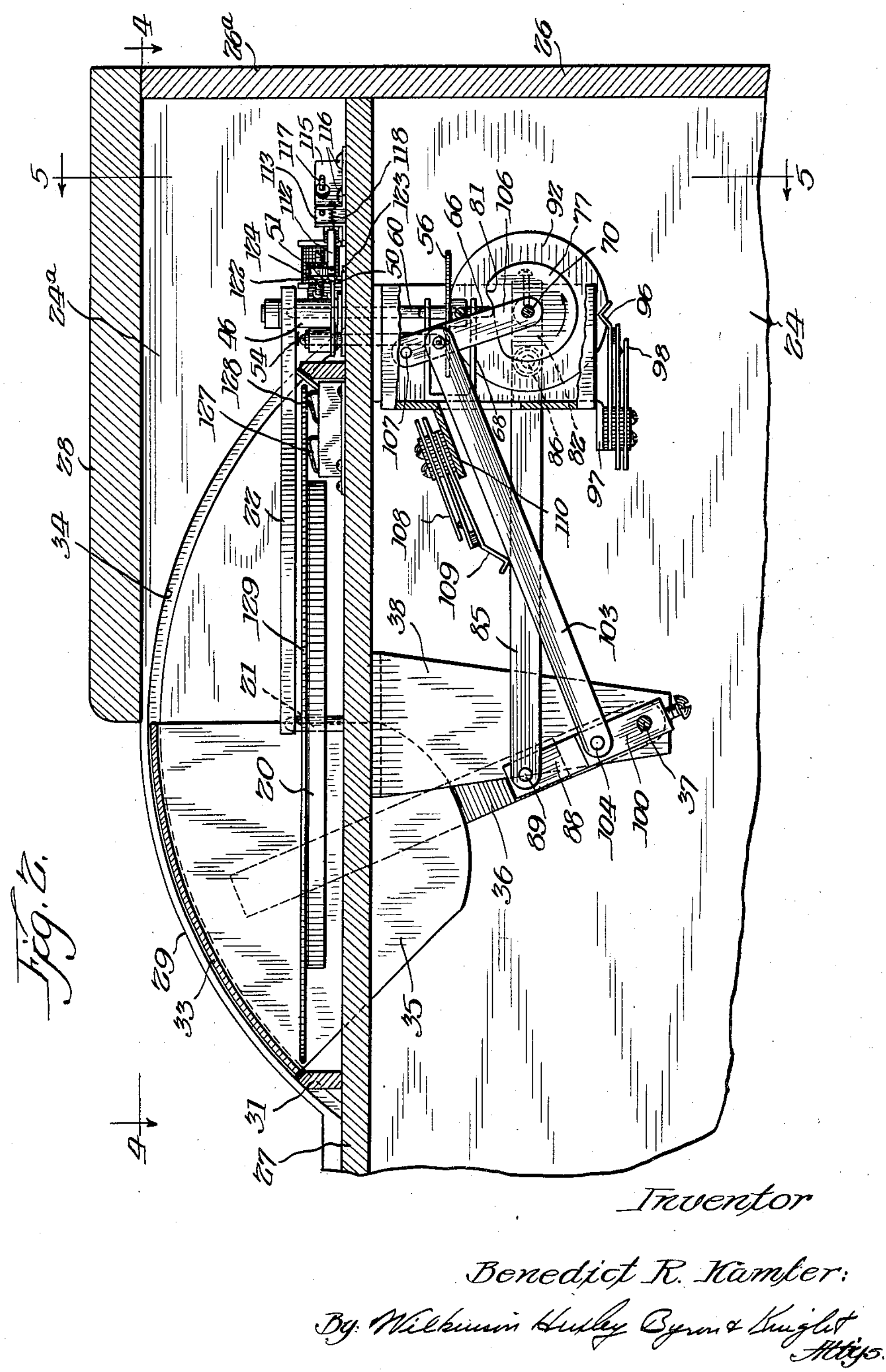
Figure 2 is a fragmentary vertical sectional view of the phonograph mechanism of Figure 1 showing the same in playing position.

The canopy 33 is adapted to rest on said supports when in a closed and open position respectively. Figure 1 shows the canopy 33 resting on support 32, the canopy being in open position. Figure 2 shows the canopy resting on support 31, the same being in closed position. It is desired that the surface of the supports adapted to contact with the canopy be covered with felt or similar material to eliminate any noise which might otherwise occur as the canopy moves from one position to the other. The side portions 24*a* together with their forward extensions 30 may be provided with an arcuate groove 34 for receiving the canopy which therefore is guided at its respective ends as a result of said groove and extends from one side wall of the cabinet to the opposite side wall. It will be observed that the canopy in open position is substantially located under top wall 28 and within this protecting part of the cabinet to thereby uncover the turntable, rendering the turntable accessible to the operator. Records may be placed on the turntable or removed therefrom when the canopy is disposed in open position, although the tone arm is nevertheless protected thereby, since in this position the canopy has a location between the tone arm and the turntable. With the canopy in closed position the turntable and any record supported thereon is completely covered since the canopy together with the cabinet including top wall 28 provides a housing therefor which prevents access to the turntable and of course the tone arm and associated mechanism to be presently described.

Figure 5:
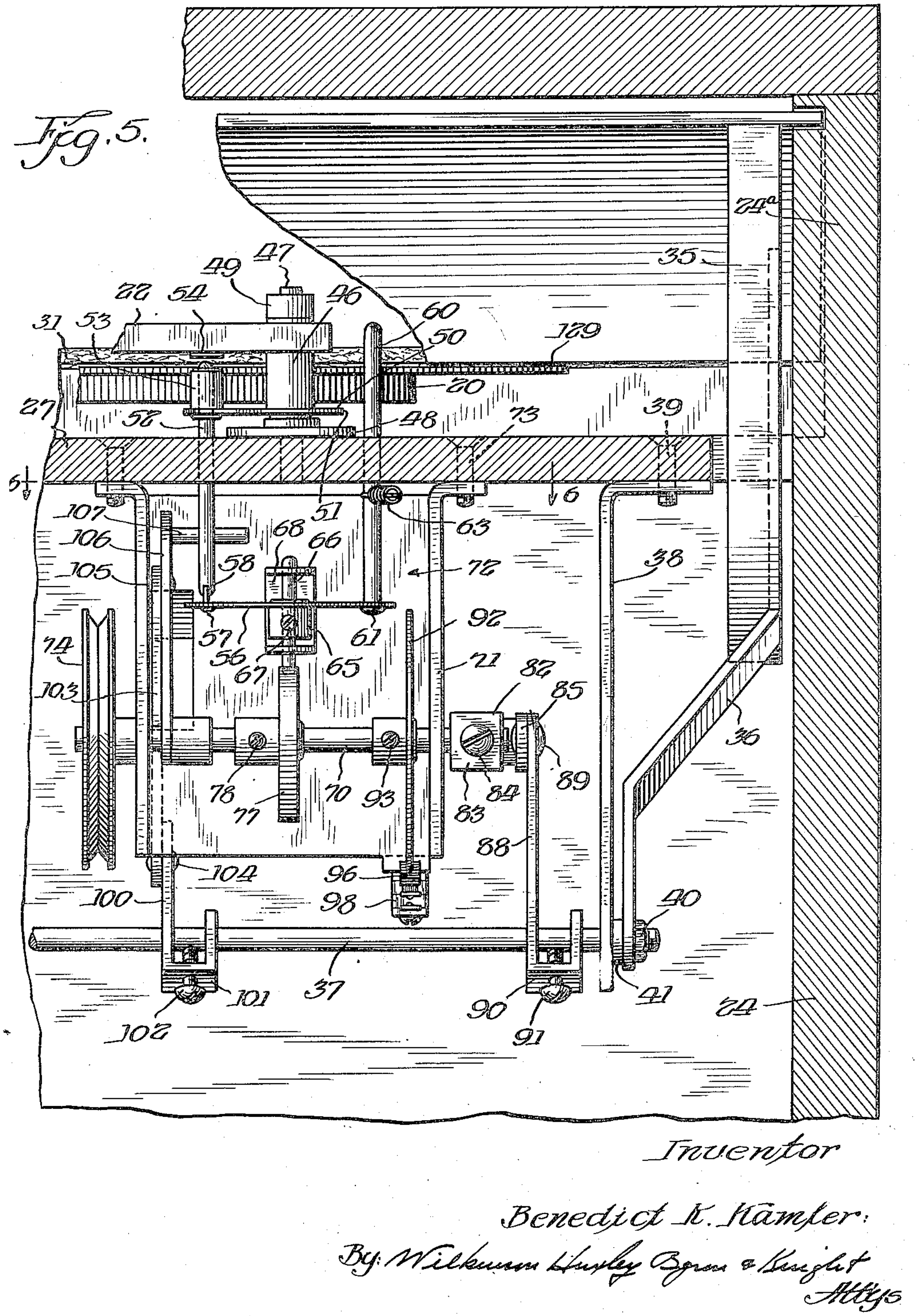
Figure 5 is a vertical sectional view taken along line 5—5 of Figure 2 and showing the elevating and turning means for the tone arm, with associated parts.

The end members 35 are suitably secured to the respective ends of the canopy and the same form the end walls of the canopy structure. A member 35 is disposed relatively adjacent each side wall 24 of the cabinet, as shown in Figure 5. A rocker arm 36 is suitably secured to each end member 35 and the same is pivotally supported at its lower end by the transverse shaft 37 which extends transversely of the cabinet, being located below partition wall 27. Shaft 37 is journalled for rotation by depending supports 38. Each support 38 is provided with a top horizontal flange which engages the undersurface of the partition 27 and is secured thereto by the screws 39. The shaft 37 is thus located the proper distance below the turntable so that the arms 36, which are oscillated upon rotation of the shaft, swing the canopy in the desired arc. Each arm 36 is nonrotatably fitted to its projecting end of shaft 37 and held to the shaft by the nut 40 with a spacing washer 41 being interposed between the arm and its support 38.

Figure 4:
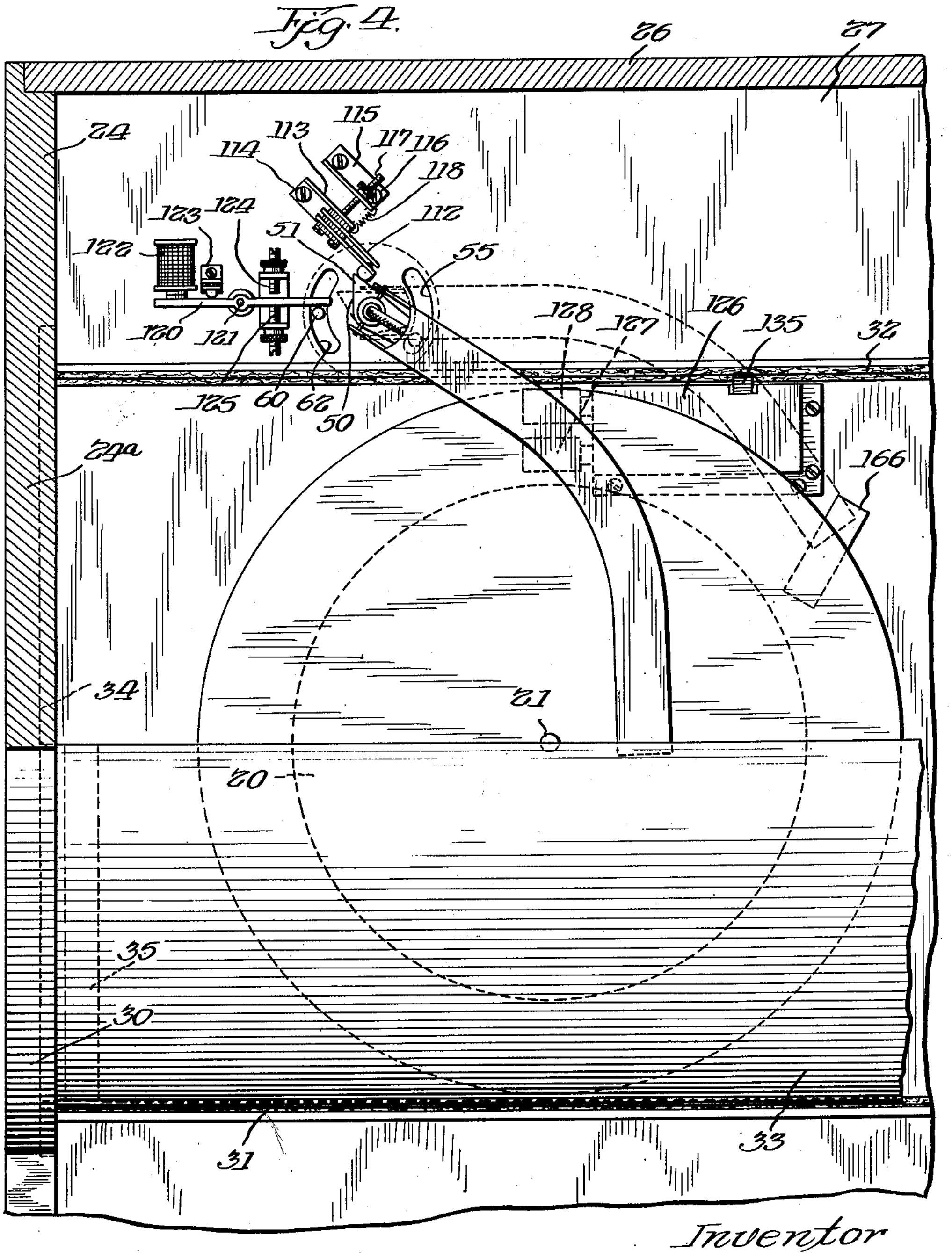
Figure 4 is a horizontal sectional view taken along line 4—4 of Figure 2 showing certain parts of the mechanism in plan.

The tone arm 22 carries the conventional form of reproducing unit 42 and a needle 43 as shown in Figure 1. At its opposite end the tone arm provides spaced extensions 44 carrying pins 45 by means of which the arm is pivotally secured to the swivel bracket 46 permitting movement of the arm in a vertical direction. The bracket 46 is mounted for rotation on the tone arm swivel post 47 fixed to partition member 27 and being disposed vertically. Rotation of the bracket on the swivel post accordingly imparts rotation to the tone arm in a horizontal plane. Said bracket is suitably supported for rotation by the base 48 and is retained in position on the post by the cap 49. A plate 50 is suitably secured to said bracket 46 so as to rotate with the same and it will be observed, as best shown in Figures 3 and 4, that said plate is provided with a switch engaging extension 51.

The tone arm has a position of rest, as shown in Figure 3, in which position the same is located to the rear of the turntable and also to the rear of the canopy. As thus located the tone arm is covered by the top wall 28 and is completely shielded by the canopy 33, preventing access thereto by the operator even when the canopy is in open position. When the canopy moves from an open to a closed position the tone arm is adapted to move from a position of rest to an operative position over the turntable for playing a record supported thereon. The means for elevating and lowering the turntable and for oscillating the same when elevated will now be described.

The elevating and lowering pin for the tone arm is indicated by numeral 52, the same extending in a vertical direction through plate 50, through collar 53 fixed to the plate, to project above the same for contact with plate 54 fixed to the underside of the tone arm for the purpose. Since the pin 52 is carried by plate 50 the same has oscillating movement conforming to that of the tone arm and for the purpose the partition wall 27 is provided with an arcuate shaped slot 55. The pin extends through the slot to depend below wall 27, the said lower depending end having operative association with the elevating and lowering plate 56. Said plate is provided with a circular depression 57 and to one side of said depression the metal of the plate is slotted, with the metal of the slot being bent upwardly to form the stop 58. Diametrically opposite the depression 57 the upstanding rod 60 comprising the needle positioning rod is fixedly secured to the plate as at 61. The rod extends through partition member 27 which is provided with an arcuate slot 62 for receiving the same and the coil spring 63 is secured at one end to said rod and at its other end to the pin 64 depending from the member 27. The collar 65 is secured to the undersurface of said plate 56 and the actuating pin 66 extends through said collar and plate with the plate being adjustably fixed to the pin by the screw 67. The pin 66 extends through openings formed in the respective arms of the U-shaped bracket 68. By camming action applied to the depending end of the pin the assembly including plate 56 may be raised or lowered as desired and which action may take place simultaneously with rotary movement of the plate with pin 66 as an axis. The spaced arms of the U-shaped bracket 68 thus retain the plate 56 for raising and lowering the tone arm and for oscillating the tone arm while elevated.

Figure 6:
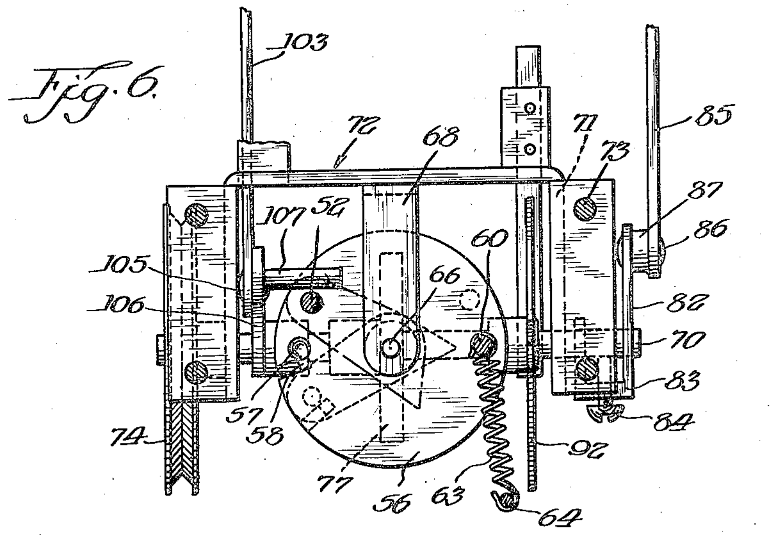
Figure 6 is a sectional view along line 6—6 of Figure 5.
Figure 10:
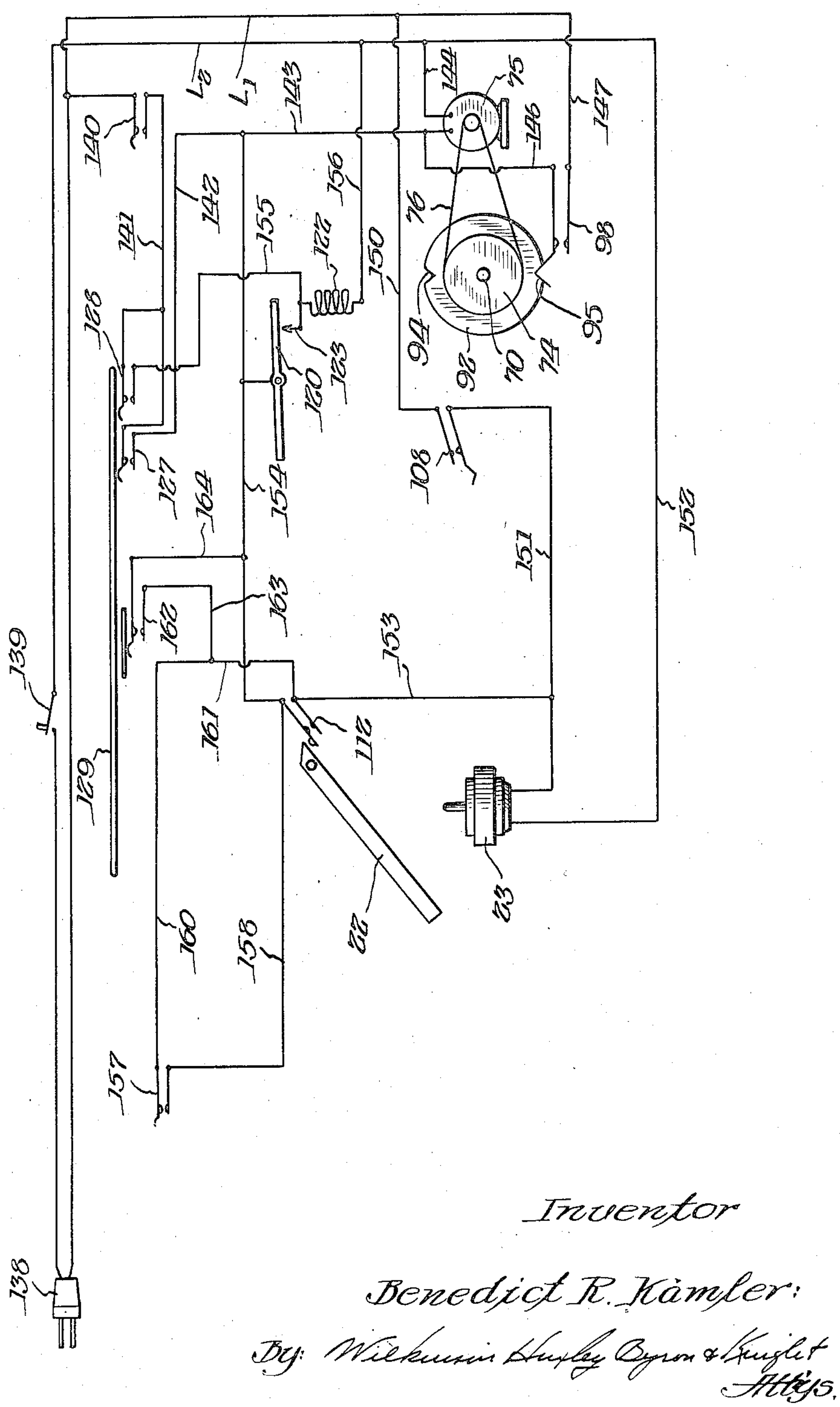
Figure 10 is a wiring diagram with parts of the mechanism being illustrated diagrammatically.

The main operating shaft 70 is suitably journaled for rotation in the side extensions 71 of a bracket 72 shown in plan in Figure 6. The side extensions 71 are flanged at their upper ends which contact the undersurface of partition member 27, being fixedly secured thereto by the screws 73. The driving pulley 74 is fixed to the left end of the main operating shaft 70 as shown in Figure 5, and said pulley is operatively connected to the driving motor 75 by the endless belt 76, as shown in Figure 10. A cam member 77 is fixedly secured to shaft 70 by the set screw 78 and said cam member is disposed in vertical alignment with pin 66 and accordingly has camming action on said pin to move said plate 56 vertically. The camming portion of said cam 77 is best illustrated in Figures 1 and 2. The portion 80 is designed to lower plate 56 in a gradual manner so that the tone arm will be gently deposited on the record. Portion 81 is designed to elevate plate 56 in a rapid manner whereby the tone arm is quickly elevated when the playing of the record is complete so that upon oscillating movement of the arm the needle will not scratch the record.

A crank 82 is fixed to the right hand end of the main operating shaft, the said crank having a U-shaped end 83 which carries the securing nut 84 for fixedly securing the crank to the shaft in proper adjusted position. One end of the canopy drive rod 85 is pivoted to said crank 82, numeral 86 indicating the pivot pin, with the parts being suitably spaced by a washer 87. The opposite end of the canopy drive rod is pivotally secured to arm 88, the numeral 89 indicating the pivot pin joining the parts. Said arm 88 has a U-shaped end 90 which is fixedly secured in proper adjusted position to the transverse shaft 37 by means of the set screw 91. Rotation of the main operating shaft 70 through crank 82, driving rod 85, and arm 88 will rock the transverse shaft 37 and thus impart oscillating movement to the canopy 33. The parts are so designed that a full swing of the canopy occurs for each half revolution of the main operating shaft 70. It will also be observed that when the canopy is in either open or closed position the crank 82 is on dead center. This dead center relation of the crank 82 and drive rod 85 is important since any attempt on the part of the user to open or close the canopy by applying motion thereto will be effectively prevented. This dead center feature is also important in connection with the control plate 92 suitably secured to the main operating shaft 70 by the pin 93. As shown in Figure 10 the plate is provided with diametrically spaced notches 94 and 95 located in its periphery and which are engaged by the resilient detent 96 suitably secured to flange 97 of the support 72. Said spring detent has an assembled relation with the respective terminals of switch 98 and which switch is actuated by said spring detent when the same is caused to move out of either notch 94 or 95. This structure determines the positions of rest of the main operating shaft and which are 180 degrees displaced with respect to each other. Accordingly for each 180 degree rotation of the main operating shaft the crank will be moved from one dead center position to its other dead center position to either open or close the canopy.

A second arm 100 of smaller size than arm 88 is similarly secured to shaft 37 by means of the U-shaped portion 101 and set screw 102. A push rod 103 is pivotally secured to crank 100 as at 104 and said opposite end of the push rod is pivoted at 105 to the tone arm return crank 106. Said crank 106 is supported by the main operating shaft 70 so as to have free pivotal movement on said shaft. The free end of the crank carries a member 107 located in front of and adapted to contact the elevating and lowering pin 52 for the tone arm. As a result of movement imparted to pin 52 by said member 107 the tone arm is oscillated.

Push rod 103 is adapted to actuate switch 108 comprising spaced contacts and an actuating member 109 which are suitably secured in assembled relation to bracket 110 comprising part of the rear wall of bracket 72. Switch 108 controls the electric circuit to the phonograph motor 23 shown in the wiring diagram, Figure 10, so that rotation of the turntable is initiated by the push rod 103 as the canopy is caused to close and is terminated following the playing of a record as the canopy is caused to open.

In Figure 2 the plate 56 is shown in its lowermost position since pin 66 is in contact with a low portion on cam member 77. A similar position of the parts is illustrated in Figure 5 wherein it will be observed that the pin 52 is out of engagement with plate 56 and the tone arm is likewise free of the pin so that the arm may travel over a record for playing the same without interference as regards said pin.

When the playing of the record is completed and the needle of the tone arm has reached the tripping groove in the record it will be observed by reference to Figure 4 that the switch extension 51 has been caused to contact switch 112. Said switch is a normally open switch and as a result of engagement by extension 51, due to extreme travel of the tone arm toward the center of the record, the same is closed, thereby closing the electric circuit to motor 75. It is necessary that switch 112 be properly positioned in order that the terminals of the same will be closed when the playing of the record has been completed. In accordance with the invention said switch is carried by bracket 113 and secured to member 27 by a single screw 114 so that some adjustment of the switch is possible. Bracket 115 is fixedly secured by one or more screws 116 in spaced relation with the switch 112. Said bracket 115 carries an adjusting screw 117 which contacts the pivoted bracket 113 and thus determines the position of the switch. Said pivoted bracket is yieldingly urged into contact with the adjusting screw by the coil spring 118.

When said switch 112 is closed to close the circuit to motor 75 the main operating shaft 70 is rotated, with the result that the portion 81 on cam member 77 is almost immediately caused to contact pin 66, thus elevating plate 56 which elevates pin 52 to lift the tone arm 22 from the record. This rotation of the main operating shaft will also have caused actuation of crank 82, the canopy drive rod 85 and arm 88 to oscillate the canopy 33, causing the same to move from its closed position toward an open position. Simultaneously with said movement the push rod 103 will have been actuated to cause movement of member 107 in a direction toward the right as shown in Figure 2. Said member accordingly contacts pin 52 to produce oscillating movement of the tone arm to effect return of the tone arm to its position of rest. Initial movement of the tone arm takes place independently of plate 56. This movement is represented by the distance the tone arm moved in order to play the record. Additional movement of the pin 52 will seat the same in depression 57 and bring the pin into contact with stop 58. As member 107 continues its movement the pin 52, the tone arm 22 and the plate 56 will be rotated since the three elements are operatively connected during motion in this direction by the stop 58. It will be observed that the plate 56 is rotated against the tension of coil spring 63 and that said rotation takes place while the plate is elevated since pin 66 is now in contact with the high portion of cam member 77. When the main operating shaft 70 has rotated half a revolution one of the notches 94 and 95 will allow detent 96 to seat, thus opening switch 98 and causing the operating motor to stop. When this takes place the canopy 33 will be located in open position and the tone arm in its position of rest. The tone arm is maintained elevated by pin 52 since plate 56 is held in elevated position.

The needle positioning rod 60 is oscillated by plate 56 in a manner conforming to the oscillations of the tone arm 22. In accordance with the invention the tone arm is automatically located in proper position for playing a ten or twelve inch record. The adjusting mechanism for accomplishing this is shown in Figures 1 and 2, the same comprising a stop arm 120 pivoted at 121, with one end being disposed over the slot 62 and its opposite end having a position adjacent the magnet 122. Holding switch 123 is suitably fixed to member 27 adjacent magnet 122 and is adapted to be closed by stop arm 120 when the same is attracted by the magnet. An adjusting screw 124 is provided for determining the position of arm 120 for a ten inch record and a similar adjusting screw 125 is provided for determining the position of the arm for a twelve inch record.

Figure 7:
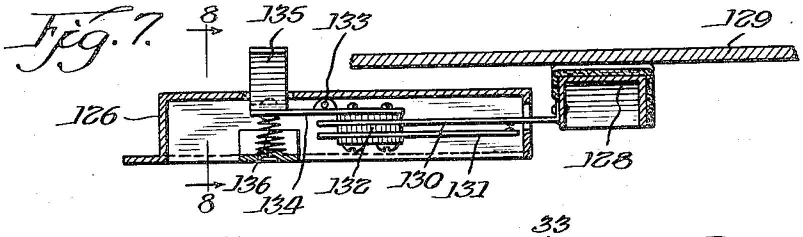
Figure 7 is a detail sectional view showing the construction of the electric switch controlled by the canopy.
Figure 8:
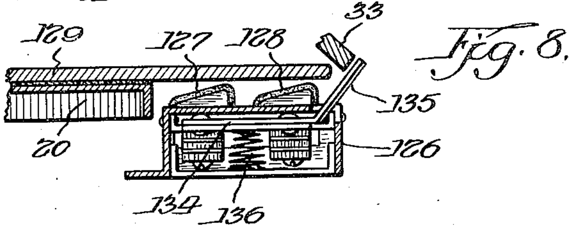
Figure 8 is a detail sectional view taken along line 8—8 of Figure 7.

In accordance with the invention a pair of electric switches are located adjacent the turntable and under the record supported thereon so as to be actuated by the record. The switch casing 126 is suitably fixed to member 27, as best shown in Figures 1 and 2. The switch structure housed within said casing provides a pair of switches each including a contact member disposed in spaced relation with each other and identified by numerals 127 and 128. Member 127 is adapted to be engaged by a ten inch record as well as a twelve inch record, whereas member 128 is engaged only by a twelve inch record. Details of the switch structure are best shown in Figures 7 and 8. The members 127 and 128 are each suitably supported exteriorly of the casing 126 by a contact member 130. The contact members 130 and 131 for each switch are suitably secured to an insulating block 132 pivotally supported at 133 by means of the arm 134. The arm is provided with a diagonal part 135 which projects upwardly above casing 126 and adjacent support 32. Said part 135 is thus engaged by the canopy 33 when in open position to rock arm 134, bringing members 128 and/or 127 up against a record supported on the turntable and thereby effecting a closing of the switch contacts 130 and 131 for one or both switches. In the event a record is not on the turntable it will, of course, be understood that the contacts of neither switch are closed. When a ten inch record is placed on the turntable only member 127 is caused to engage the same and thus the contacts of this switch only are closed. However, when a twelve inch record is placed on the table the contacts of both switches are closed since members 127 and 128 are both caused to contact the record.

With the tone arm in a position of rest, as shown in Figure 3, it will be observed that the needle positioning rod 60 is spaced a maximum distance from the stop arm 120. When the motor 75 is energized to produce rotation of main operating shaft 70 for playing a record the tone arm is swung to an operative position over the turntable in synchronism with oscillating movement of the canopy from an open to a closed position. As the canopy moves from its open position push rod 103 is actuated, causing movement of member 107 in a direction toward the left, Figures 1 and 2. As member 107 moves away from pin 52 plate 56 is rotated by spring 63, the action of the spring on the plate producing rotation thereof and also movement of pin 52, and thus the tone arm, which is moved toward the turntable. Also the rod 60 is moved by the plate 56 in a direction toward the stop arm 120, Figures 3 and 4. Rotation of plate 56 continues until said rod 60 contacts the stop arm. If the magnet 122 has been energized the arm is held against adjusting screw 125 for playing a twelve inch record. If magnet 122 has not been energized the stop arm will contact positioning screw 124 and thus the tone arm will have limited additional movement for playing a ten inch record.

Although plate 56 is held against further rotation in this direction by the needle positioning rod the member 107 will continue to move its full distance until the canopy 33 is in closed position. When the canopy has been so positioned the cam member 77 will have been rotated, as shown in Figure 2, with the needle 66 in contact with the low portion 80 of the cam. Plate 56 is accordingly lowered and the adjustment of said plate on pin 66 should be such that pin 52 is free of the plate and this allows the pin to descend to its lowermost position out of contact with tone arm 22, being retained, however, by collar 53. As canopy 33 is moved from an open to a closed position push rod 103 is caused to contact member 109 of the switch 108, closing the contacts of said switch to energize motor 23, with the result that the turntable is rotated to cause rotation of the record. It will be understood that rotation of the record takes place in advance of the actual lowering of the tone arm onto the record.

The various switches of the present apparatus, the magnet 122, driving motor 75, and the turntable motor 23 are electrically connected in circuit as diagrammatically illustrated in the wiring diagram of Figure 10. The electric plug 138 is adapted to be connected to a source of electric current and the same provides power leads $L_1$ and $L_2$, representing the negative and positive terminals of the current source. For operation of the present mechanism the master switch 139 is closed. A record 129 is then placed on the turntable and the start button 140 is actuated by the operator to close this switch. Assuming, for illustrative purposes, that a ten inch record has been placed on the turntable, then switch 127 only is closed and the electric circuit through motor 75 is closed to energize said motor as follows—from lead $L_1$, switch 140, conductor 141, switch 127, conductors 142 and 143, to motor 75, to conductor 144 to $L_2$. Operation of motor 75 will rotate the main operating shaft 70, producing rotation of control plate 92. As a result the detent 96 moves out of its notch to effect closing of switch 98, which functions as an interlocking switch, closing the circuit to the motor through conductors 146, 147 and 148. The motor continues in operation notwithstanding that switch 140 is opened since the operator momentarily closes the same, and likewise switch 127, which is opened as a result of movement of canopy 33 from part 135, allowing spring 136 to take over so that the switch contacts naturally open.

Switch 108 is closed, as herein described, by push rod 103, closing the circuit to motor 23, through conductor 150, said switch 108, conductor 151, motor 23, and conductor 152. As the tone arm is lowered onto the rotating record the main operating shaft 70 will have rotated a half revolution whereby the notch 94 will align with the detent 96, seating said detent, opening switch 98, and stopping motor 75.

The parts are held in this position with the phonograph motor operating and with the tone arm in contact with the record until the tone arm reaches the tripping groove in the record. The action of the tripping groove is to bring extension 51 of plate 50 into contact with switch 112, closing the switch, which has the effect of again energizing the motor in the following manner: from lead $L_1$, conductor 150, conductor 151, conductor 153, said switch 112, conductor 154 to conductor 143, through motor 75, to conductor 144 and back to lead $L_2$. Said motor 75 continues in operation until the tone arm has been located in its position of rest and with the canopy in its open position. Here again switch 98 acts as an interlocking switch to maintain the circuit to the motor closed after switch 112 is permitted to open and the circuit to the motor is broken when switch 98 seats in said notch 95.

When a twelve inch record is placed on the turntable both switches 127 and 128 are closed. The circuit to the motor 75 is closed through push button switch 140 and switch 127, as previously described. However, since switch 128 is now closed and the magnet 122 is energized through said switch 128, conductor 155 and conductor 156. The stop arm 120 is immediately attracted to said magnet, closing switch 123, which acts as an interlocking switch, holding the circuit to the magnet 122 closed since switch 128 is opened when the canopy moves away from part 135.

A reject switch 157 is provided so that the operator may close the same in the event he desires to terminate the playing of a record in advance of completion. By conductors 158, 160 and 161 said switch is connected in parallel with switch 112 so that closing of the reject switch has the same effect to start operation of motor 75 as if switch 112 had been closed through actuation of the tone arm.

Figure 9:
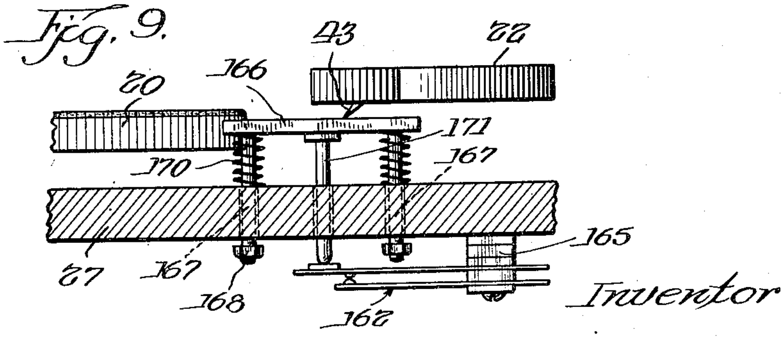
Figure 9 is a sectional view showing in elevation another electric switch controlled by the tone arm.

In the event the operator should start operation of the mechanism without placing a record on the turntable the same includes means in the form of a safety switch 162 for returning the tone arm to its position of rest. From the wiring diagram it will be observed that switch 162 is also connected in parallel with switch 112, one terminal being connected to one side of said switch by conductors 161 and 163, whereas the other terminal is connected by conductors 154 and 164. Constructional details of said safety switch are illustrated in Figure 9. The switch contacts are suitably secured by insulating block 165 to the underside of the partition member 27. Above the member 27 there is located a platform 166, the same having a position adjacent the turntable and disposed so as to have engagement with the needle 43 of the tone arm for both a ten or twelve inch record. Depending supports 167 extend through member 27 to receive the securing nuts 168. The platform is held in elevated position by coil springs 170, with the nuts 168 limiting upward movement so that the platform is normally located below a record supported on the turntable. The center depending pin 171 extends through member 127 to contact a terminal of switch 162. Normally said switch 162 is open since the platform is held elevated by coil springs 170. However, when the tone arm is lowered onto the platform the weight of said arm will close the contacts of switch 162. Operation of the motor is started through the electrical circuit as described in connection with Figure 10, and the tone arm is returned to its position of rest with the canopy also being returned to its open position.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In phonograph mechanism, in combination, a cabinet, a turntable and means for rotating the same housed by the cabinet, canopy means for covering said turntable having an open and a closed position with the cabinet, said canopy means in open position rendering the turntable accessible to the operator for changing a record and in closed position covering said turntable in combination with the cabinet for protecting the record, a tone arm having a position of rest within the cabinet and rearwardly of the canopy means when in open position, and means for actuating the tone arm from said position of rest to an operative position and return for playing the record, said canopy means having movement from an open to a closed position in synchronism with the tone arm.

2. In phonograph mechanism, in combination, a cabinet, a turntable and means for rotating the same housed by the cabinet, canopy means for covering said turntable having an open and a closed position with the cabinet, said canopy means in open position rendering the turntable accessible to the operator for changing a record and in closed position covering said turntable in combination with the cabinet for protecting the record, a tone arm having a position of rest within the cabinet and rearwardly of the canopy means when in open position, means for actuating the tone arm from said position of rest to an operative position over the record and return for playing said record, and other means having actuation in synchronism with the tone arm for moving the canopy means from an open to a closed position as the tone arm is rendered operative and for returning the canopy means to an open position as the tone arm is returned to its position of rest.

3. In phonograph mechanism, in combination, a cabinet, a turntable within the cabinet and positioned so that a top wall of the cabinet is disposed partly over the turntable, canopy means for the turntable having oscillating movement to and from open and closed positions, said canopy means in open position having location under said top wall and rearwardly of the turntable and in closed position being located over the turntable to form a cover therefor in combination with the cabinet for protecting a record on the turntable, a tone arm pivotally supported for oscillating movement from a position of rest under said top wall and rearwardly of the turntable to an operative position over the turntable for playing a record, means for actuating said tone arm, and means for actuating the canopy means in synchronism so that the canopy means is closed when the tone arm is playing a record and is open when the tone arm is in its position of rest.

4. Phonograph mechanism as defined by claim 3, wherein the means for actuating the tone arm includes means for elevating and lowering the same and means for oscillating the tone arm when elevated, and control mechanism for controlling the lowering of the tone arm in accordance with the size of the record placed on the turntable for playing.

5. In phonograph mechanism, the combination with a turntable and means for rotating the same, of a tone arm having a position of rest rearwardly of the turntable, means for actuating said tone arm from said position of rest to an operative position over the turntable and return for playing a record placed on the turntable, canopy means disposed over the turntable and having oscillating movement to and from forward and rearward positions with respect to the turntable, said canopy means in its rearward position being disposed between the turntable and the position of rest of the tone arm, and mechanism for imparting oscillating movement to the canopy means in synchronism with the actuation of said tone arm.

6. In phonograph mechanism, the combination with a turntable and means for rotating the same, of a tone arm having a position of rest rearwardly of the turntable, means for actuating said tone arm from said position of rest to an operative position over the turntable and return for playing a record placed on the turntable, canopy means disposed over the turntable and having oscillating movement to and from forward and rearward positions with respect to the turntable, said canopy means including an arcuate top member which is disposed over the rear half portion of the turntable when in a rearward position and over the front half portion of the turntable when in a forward position, and mechanism for imparting oscillating movement to the canopy means, said mechanism receiving actuation from the means for moving the tone arm.

7. Phonograph mechanism as defined in claim 5, wherein the means for actuating the tone arm includes means for elevating and lowering the same and means for oscillating the tone arm when elevated, and control mechanism for controlling the lowering of the tone arm in accordance with the size of the record placed on the turntable.

8. In phonograph mechanism, the combination with a turntable and means for rotating the same, of a tone arm having a position of rest rearwardly of the turntable, means for actuating said tone arm from said position of rest to an operative position over the turntable and return for playing a record placed on the turntable, canopy means disposed over the turntable and having oscillating movement to and from forward and rearward positions with respect to the turntable, said canopy means including an arcuate top member and depending side members, a shaft for pivotally supporting said depending side members, and means for rocking said shaft to oscillate the canopy means, said rocking means for the shaft having a dead center position when the canopy means is located in either forward or rearward positions.

9. In phonograph mechanism, the combination with a turntable and means for rotating the same, of a tone arm for playing a record placed on the turntable, a canopy disposed over the turntable and having oscillating movement to and from forward and rearward positions, a shaft positioned below the turntable for pivotally supporting the canopy for said oscillating movement, a swivel bracket located rearwardly of the turntable and mounted for rotation about a vertical axis, said bracket pivotally supporting one end of the tone arm for movement vertically about a horizontal axis, mechanism including an elevating plate for elevating and lowering the tone arm, a cam member for moving the plate in a vertical direction, means oscillating the tone arm in a horizontal plane whene elevated, and other means operatively connected to the shaft for oscillating the canopy in synchronism with the oscillating movement of the tone arm.

10. In phonograph mechanism, the combination with a turntable and means for rotating the same, of a tone arm for playing a record placed on the turntable, a canopy disposed over the turntable and having oscillating movement to and from forward and rearward positions, a shaft positioned below the turntable for pivotally supporting the canopy for said oscillating movement, a swivel bracket located rearwardly of the turntable and mounted for rotation about a vertical axis, said bracket pivotally supporting one end of the tone arm for movement vertically about a horizontal axis, mechanism including an elevating plate for elevating and lowering the tone arm, a main operating shaft, a cam member on the shaft rotated thereby for moving the plate in a vertical direction, means receiving actuation from the main shaft and connected to said first mentioned shaft for oscillating the canopy, and other means connected to said first mentioned shaft for oscillating the tone arm in a horizontal plane when the same is elevated by the elevating plate.

11. In phonograph mechanism, the combination with a turntable and means for rotating the same, of a tone arm for playing a record placed on the turntable, a canopy disposed over the turntable and having oscillating movement to and from forward and rearward positions, a shaft positioned below the turntable for pivotally supporting the canopy for said oscillating movement, a swivel bracket located rearwardly of the turntable and mounted for rotation about a vertical axis, said bracket pivotally supporting one end of the tone arm for movement vertically about a horizontal axis, mechanism for elevating and lowering the tone arm including a pin disposed in vertical alignment under the tone arm and having oscillating movement therewith, an elevating plate adapted to contact said pin and have releasable engagement therewith, a main operating shaft, a cam member on the shaft rotated thereby for moving the plate in vertical directions, means receiving actuation from the main shaft and connected to said first mentioned shaft for oscillating the canopy, and other means connected to said first mentioned shaft and operating to contact the pin for oscillating said pin and thus the tone arm in a horizontal plane, said other means having actuation in synchronism with rotation of said cam member, whereby the tone arm is oscillated by said other means when the elevating plate is holding the tone arm elevated.

12. In phonograph mechanism, the combination with a turntable and means for rotating the same, of a tone arm for playing a record placed on the turntable, a canopy disposed over the turntable and having oscillating movement to and from forward and rearward positions, means located rearwardly of the turntable for mounting the tone arm for movement horizontally to swing over the turntable and for movement vertically for lifting and lowering the tone arm with respect to a record, mechanism including an elevating plate for elevating and lowering the tone arm, a rotatable cam for moving the plate in a vertical direction, means for oscillating the tone arm in a horizontal plane, and a main operating shaft for effecting oscillation of the canopy, rotation of said cam and oscillation of said tone arm.

13. In phonograph mechanism, the combination with a turntable and means for rotating the same, of a tone arm, means for automatically actuating the tone arm to swing the same from a position of rest adjacent the turntable to an operative position over the same and return for playing a record placed on the turntable, and canopy means for protecting the record and tone arm during play and for protecting the tone arm during non-playing periods, said canopy means having movement in predetermined relation with the movement of the tone arm, and said canopy means having a position between the turntable and tone arm during non-playing periods.

14. In phonograph mechanism, the combination with a turntable and means for rotating the same, of a tone arm having a position of rest to the rear of the turntable, means for actuating said tone arm from said position of rest to an operative position over the turntable and return for playing a record placed on the turntable canopy means for said turntable having oscillating movement to and from open and closed positions with respect to the turntable, said canopy means in its open position being disposed between the turntable and the position of rest of the tone arm, and mechanism for imparting oscillating movement to the canopy means in predetermined relation with the actuation of said tone arm.

15. In phonograph mechanism, the combination with a turntable and means for rotating the same, of a tone arm for playing a record placed on the turntable, canopy means for the turntable having oscillating movement to and from open and closed positions, said canopy means in open position having location between the turntable and the tone arm and in closed position being located over the turntable, mounting means for the tone arm having location to the rear of the turntable and providing for swinging movement of the tone arm over the turntable and for vertical movement of the same for elevating and lowering the tone arm with respect to said record, actuating means for causing vertical movement of the tone arm, and other means for synchronously oscillating the canopy means and effecting swinging movement of the tone arm.

16. In phonograph mechanism, the combination with a turntable and means for rotating the same, of a tone arm for playing a record placed on the turntable, canopy means for the turntable having oscillating movement to and from open and closed positions, said canopy means in open position having location between the turntable and the tone arm and in closed position being located over the turntable, means located to the rear of the turntable for mounting the tone arm for universal movement whereby the tone arm may oscillate to swing over the turntable and return and may move vertically for lifting and lowering movement with respect to said record, mechanism for elevating and lowering the tone arm including a member disposed in alignment under the tone arm and having oscillating movement therewith, actuating means for elevating and lowering the member to effect corresponding movement of the tone arm, and other means having associated relation with said member for effecting oscillating movement of the tone arm and also the canopy means.

BENEDICT R. KAMLER.

REFERENCES CITED

The following references are of record in the file of this patent:

UNITED STATES PATENTS

| Number | Name | Date |
|---|---|---|
| 1,517,690 | Abt | Dec. 2, 1924 |
| 2,203,096 | La Forest | June 4, 1940 |
| 2,219,230 | Krause | Oct. 22, 1940 |
| 2,241,496 | Wallace | May 12, 1941 |
| 2,370,875 | Pressley | Mar. 6, 1945 |
| 2,376,741 | Weaver | May 22, 1945 |
| 2,441,893 | McKee | May 18, 1948 |

FOREIGN PATENTS

| Number | Country | Date |
|---|---|---|
| 114,471 | Australia | Jan. 13, 1941 |